No. 792,167. PATENTED JUNE 13, 1905.
E. C. RICHARD.
TRANSMISSION GEARING.
APPLICATION FILED JAN. 26, 1904.

3 SHEETS—SHEET 1.

Witnesses
Geo. N. Graves
Jas. P. Barry

Inventor
Eugene C. Richard
By James Whittemore
Atty.

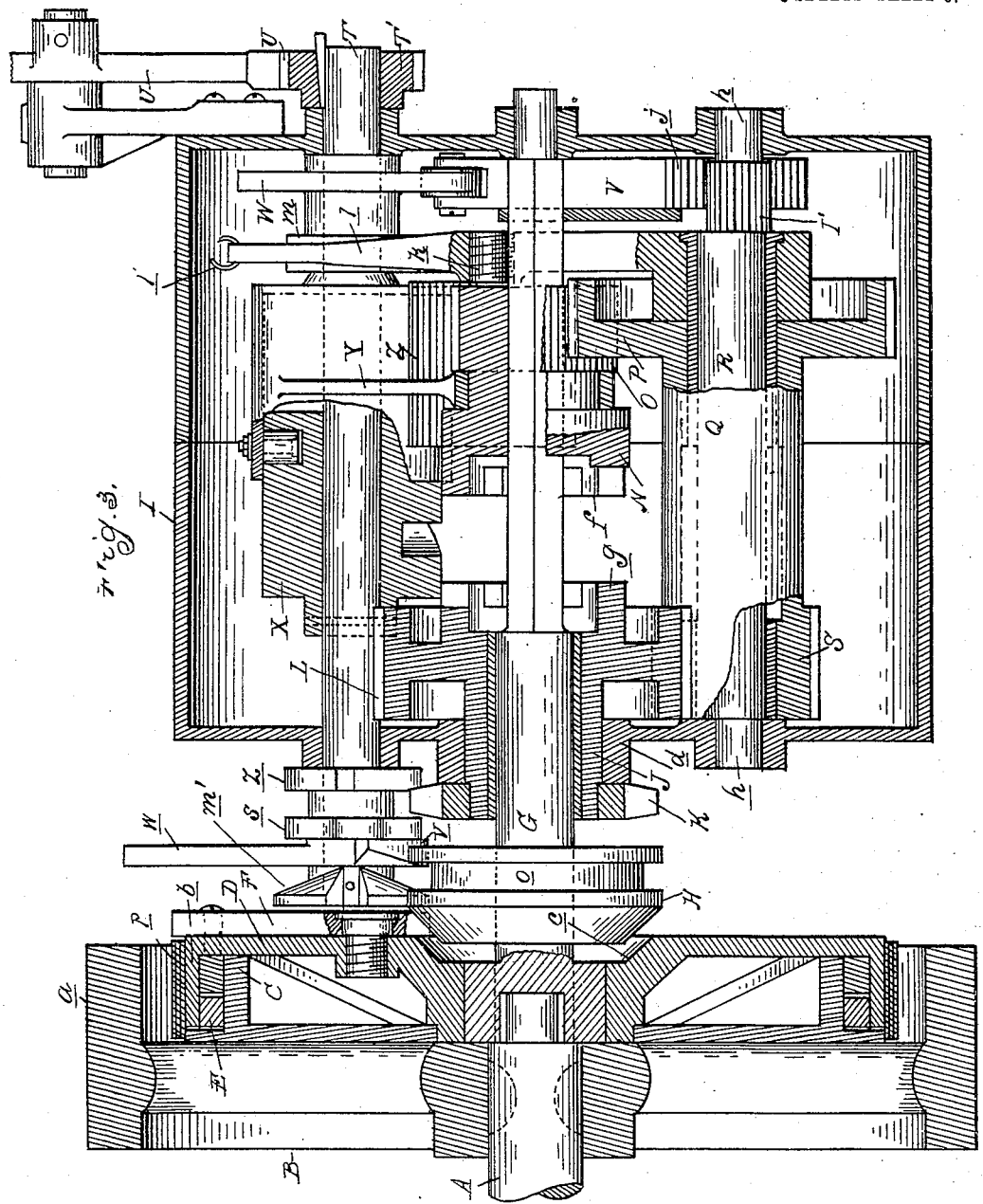

No. 792,167.

Patented June 13, 1905.

UNITED STATES PATENT OFFICE.

EUGENE C. RICHARD, OF DETROIT, MICHIGAN, ASSIGNOR TO THE BUICK MOTOR COMPANY, OF DETROIT, MICHIGAN, A CORPORATION OF MICHIGAN.

TRANSMISSION-GEARING.

SPECIFICATION forming part of Letters Patent No. 792,167, dated June 13, 1905.

Application filed January 26, 1904. Serial No. 190,673.

*To all whom it may concern:*

Be it known that I, EUGENE C. RICHARD, a citizen of the United States, residing at Detroit, in the county of Wayne and State of Michigan, have invented certain new and useful Improvements in Transmission-Gearing, of which the following is a specification, reference being had therein to the accompanying drawings.

It is one of the objects of the invention to obtain a construction of transmission-gearing in which the driving connection is always broken in advance of any shifting of the gears which would alter the speed of the driven member.

It is a further object to provide means for gradually reëstablishing the driving connection, which means is controlled independently from the means employed for changing the gear.

The invention consists in a construction by which the above-specified advantages are attained and, further, in the peculiar construction, arrangement, and combination of parts, as hereinafter set forth.

Figure 1:
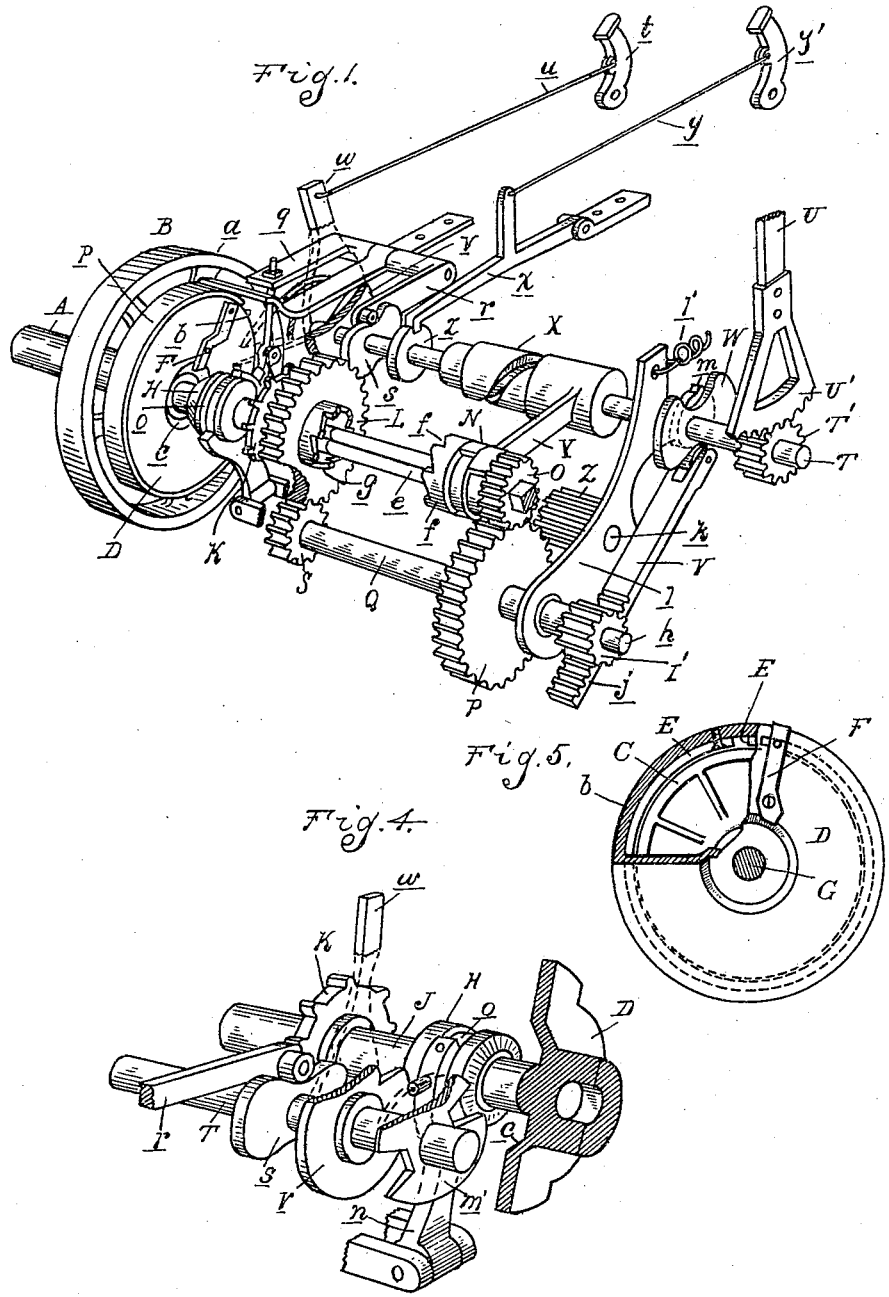
Figure 2:
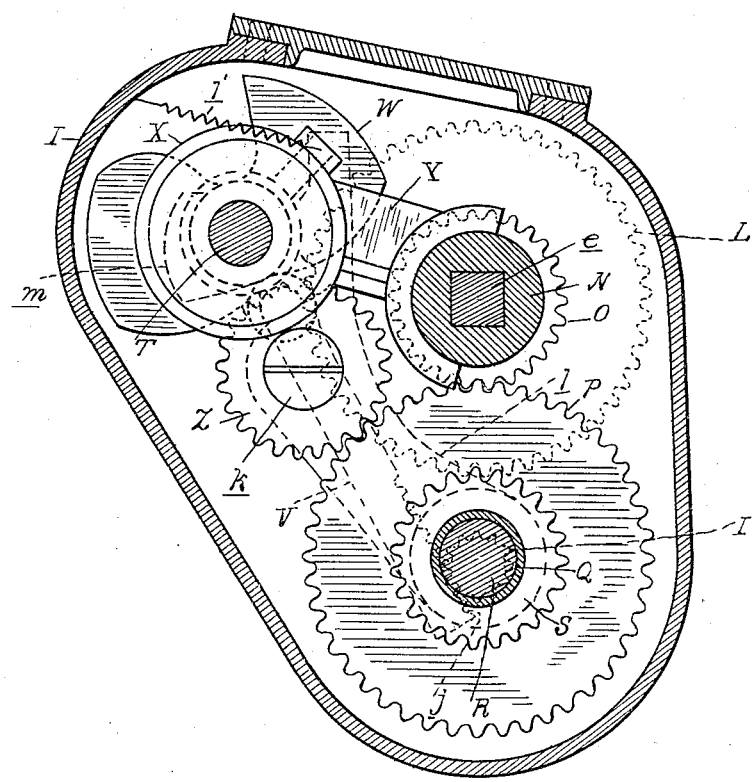

In the drawings, Figure 1 is a perspective view of the transmission-gearing with the gear-housing removed. Fig. 2 is a cross-section through the gear-housing. Fig. 3 is a longitudinal section thereof, partly in elevation; and Figs. 4 and 5 are detail views with parts cut away.

A is the drive-shaft—as, for example, the crank-shaft of an engine—and B is the fly-wheel therefor.

C is an annular flange projecting laterally from the fly-wheel B and preferably arranged within the rim $a$ thereof.

D is a rotary head having an annular flange $b$ surrounding the flange C, but spaced therefrom. Between the flanges $b$ and C is arranged a friction-clutch consisting of the spiral band E, the outer end of which is connected to the flange $b$ and the inner end to a lever F, fulcrumed on the head D. The arrangement is such that when the lever F is given the proper movement the spiral band E will be tightened to frictionally engage with the flange C, thereby coupling said flange with the head D. The head D is secured upon a shaft G, which forms an extension of the shaft A in axial alinement therewith. The shaft G extends into a casing I, which forms a housing for a transmission-gearing of the following construction.

J is a tubular shaft sleeved upon the shaft G and extending out through a bearing $d$ in the casing. K is a sprocket connected to the outer end of this tubular shaft, and L is a gear-wheel secured to the inner end thereof and arranged within the casing I. N is a collar sleeved upon the shaft G, preferably upon a squared extension $e$ thereof. This collar has formed thereon one member $f$ of a positive locking-clutch, which is adapted to engage with the complementary member $g$ on the gear-wheel L. O is a pinion secured to the collar N and adapted to engage with a gear-wheel P, mounted upon a shaft Q, extending parallel to the shaft G. This shaft Q is preferably tubular and is journaled in bearings in the casing I. The portions $h$ of the axle R which are journaled in the casing are eccentric to the portions of said axle upon which the tubular shaft Q is journaled, so that a rotation of the axle in its bearings will shift the position of said shaft. S is a pinion secured to the tubular shaft Q and normally meshing with the gear-wheel L. The pinions and gear-wheels O, P, S, and L thus form a drive-train through which motion may be transmitted from the shaft G to the tubular shaft J and from the latter to the sprocket K. This drive-train is, however, broken whenever the collar N is shifted longitudinally upon the shaft G, so as to disengage the pinion O from the gear P. To facilitate the reëngagement of the pinion O and gear-wheel P, the tubular shaft Q, carrying the gears P and S, is automatically shifted in position simultaneously with the movement of the collar N. This movement causes the temporary separation of the pinion O and gear-wheel P, thereby permitting the free endwise movement of the pinion without interference with the teeth of the gear. Subsequently the teeth are thrown into mesh by a return movement of the shaft Q. The mechanism for effecting this movement is preferably of the following construction.

T is a cam-shaft for controlling the various movements, which shaft is actuated from a lever U through the medium of a gear-segment U' thereon engaging with the pinion T' on the shaft T. I' is a pinion on the axle R, which is concentric to the portion $h$ thereof. V is a rod, one end of which has formed thereon the rack $j$, engaging with the pinion $i$. The opposite end of this rod extends in proximity to a cam W on the shaft T, said cam being designed to cause in its rotation a reciprocating movement to the rod V, which through the pinion $i$ will rotate the axle R in its eccentric portion $h$, thereby shifting the position of the tubular shaft Q. X is another cam upon the shaft T, which is preferably in the form of a grooved cylinder. Y is an arm, one end of which is forked to embrace a grooved bearing on the collar N, the opposite end being sleeved upon the shaft T and engaging the cam X. The cam X is adapted in the rotation of the shaft T to cause the lateral reciprocation of the arm Y, thereby causing the shifting of the collar N upon the shaft G. Thus a suitable movement of the lever U will cause the rotation of the shaft T, which will simultaneously shift the collar N longitudinally upon the shaft G and the tubular shaft Q laterally, so as to throw the pinion O and gear-wheel P out of mesh.

The mechanism thus far described is adapted to drive the sprocket K in the same direction of rotation as the shafts A and G and either at the same speed as said shafts where clutch members $f$ and $g$ are in engagement or at a slower speed than the shaft through the gear-train O, P, S, and L. A reverse movement may be imparted to the sprocket through the following mechanism.

Z is a pinion journaled upon a stub-axle $k$, which is attached to a lever or a rock-arm $l$, pivoted upon the axle R, and $m$ is a cam on the shaft T, which engages with the movable end of the rock-arm $l$ and is adapted to actuate the same. $l'$ is a spring for holding the lever $l$ in contact with the cam $m$. The pinion Z is constantly in mesh with the gear-wheel P and may also be thrown into mesh with the pinion O by suitable movement of the lever $l$. This latter arrangement is, however, never accomplished excepting where the collar N has first been shifted to disengage the pinion O from the gear-wheel P. When such shifting is effected, the sprocket K will be driven in reverse direction through the gear-train comprising the pinions O and Z, gear-wheel P, pinion S, and gear-wheel L.

The clutch connection between the shaft A and head D is preferably operated by the lever U in disengaging through the following mechanism.

H is a collar feathered upon the shaft G and having an inclined or conical face. $m'$ is a cam upon the shaft T, which is adapted to engage with a bifurcated rock-arm $n$, the furcations of which engage with a groove $o$ in the collar H. The cam $m'$ is so shaped that upon the proper movement of the shaft T the rock-arm $n$ will be shifted to draw the collar H out of engagement with the lever F. The lever F is arranged upon the head D so that its inner end projects into the path of the inclined face on the collar H, and thus whenever said collar is moved inward the lever F is actuated to simultaneously engage the clutch formed by the spiral band E. On the other hand, whenever the collar H is moved by the rock-arm $n$ in the opposite direction the lever F will be released, thereby permitting the spiral band to automatically disengage.

From the above description it will be understood that the head D will be uncoupled from the driving-shaft whenever the cam $m'$ is thrown into operation, and this cam is shaped to accomplish this result at two different points in the movement of the shaft T. It is necessary to provide means for arresting the movement of said head due to its momentum. This is accomplished by a peripheral brake $p$, surrounding the flange $b$ of the head, one end of which is connected to a rock-arm $q$. This rock-arm is connected to an actuating rock-arm $r$, which projects into operative relation to a cam $s$ on the shaft T, the arrangement being such that whenever the clutches are released from the head D the peripheral brake $p$ will be tightened through the actuation of the cam $s$, rock-arms $r$ and $q$.

As has been before stated, the throwing in of the clutches to establish the drive connection is controlled by independent means from that employed for shifting the gears. This controlling connection is preferably actuated by the foot of the operator and is of the following construction.

$t$ is a pedal-lever which is connected by a rod $u$ with an arm $w$ upon a cam $v$, revolubly sleeved upon the shaft T adjacent to the cam $s$ thereon. This cam $v$ is complementary to the cam $m'$ and is adapted when operated to shift the rock-arm $n$ in the opposite direction to the movement imparted thereto by the cam $m'$. As a consequence the operation of the cam $v$ will cause the movement of the rock-arm $n$ and collar H, so as to engage with the arm F and cause it to tighten the spiral band E above the flange C. This will couple the head D with the fly-wheel.

The parts being constructed and operating in the manner above described, the general operation of the mechanism is as follows:

The lever U has two neutral positions—that is, two points in its movement at which all of the mechanism of the transmission-gearing is disconnected from the motor or drive shaft. One of these neutral positions is arranged between the positions of the lever in which the transmission-gearing is shifted, respectively, to high speed and slow forward speed. The other neutral position is between the slow forward speed and the reverse positions of the lever. Supposing the lever U to be at its neutral position between the slow forward speed and reverse, the operator desiring to drive the mechanism forward first shifts the lever U one point, which actuates the cam W, so as to cause a movement of the rod V, causing the rack $j$ to actuate the pinion $i$ and rotate the axle R on its eccentric bearing $h$. This will carry the tubular bearing Q, together with the pinion S and gear-wheel P thereon, into a position where said pinion and gear-wheel are respectively in mesh with the gear L and pinion O. In this position of parts the gearing is ready for driving the mechanism forward at a slow speed; but before this can be accomplished it is necessary first to couple the head D with the motor-shaft. To do this, the operator presses the lever $t$, which, through the rod $u$, actuates the cam $v$, shifting the collar H into engagement with the lever F to tighten the spiral band and couple the head D to the flange C on the fly-wheel. This clutch being frictional and being under the control of the operator through the pedal-lever $t$, it is evident that the starting of the mechanism may be as gradual as desired. When it is desired to throw in the high speed, the lever U is again shifted to the proper position; but in this shifting movement it first passes the second neutral position. At this neutral position the cam $m'$ will again operate the collar H through the medium of the rock-arm $n$, so as to release the lever F and disengage the spiral band E from the flange C. The cam $s$ will at the same time operate the rock-arms $r$ and $q$ to apply the peripheral brake $p$ and arrest the movement of the head D, which has been uncoupled from the shaft A. It is thus necessary for the operator to again operate the pedal-lever $t$ to reëngage the friction-clutches before the mechanism is driven forward. In shifting from the high speed to the slow speed provision is made for temporarily arresting the lever at the neutral point, so that there will be no danger of stripping the gears by throwing them in while the vehicle is still running at high speed by its momentum. For this I provide a stop-arm $x$, which is controlled by a rod $y$, leading to a foot-lever $y'$, which may be actuated by the foot of the operator. The arm $x$ is adapted to engage with a notch in a disk $z$ upon the shaft T, the position of engagement being where the lever U is at the neutral position between high and slow speeds. Thus the operator in shifting the lever U cannot move it beyond the neutral point until he has first operated the foot-lever $y'$, and before doing this he can apply the brake to the vehicle and reduce the speed. In shifting the lever U from slow speed to reverse the friction-clutches are thrown out in a similar manner and must be reëngaged by the operation of the pedal-lever $t$, and the same is true in passing from the reverse to the slow forward speed. Thus whenever there is a change in the speed of the gear the motor is disconnected and the drive connection is gradually reëstablished, thereby preventing danger of stripping the gearing.

What I claim as my invention is—

1. In a transmission-gearing the combination with a drive member and a driven member of shiftable gears intermediate said drive and driven members, a clutch adapted to be automatically released upon the shifting of said gears, and independently-operable means for throwing in said clutch, after said gears are shifted.

2. In a transmission-gearing the combination with a drive member and a driven member, of shiftable gears between said drive and driven members a rotary member intermediate said drive member and said shiftable gears, a clutch for coupling said rotary member with said drive member, and a brake for arresting said rotary member when released by said clutch.

3. In a transmission-gearing the combination with a drive and driven member of shiftable gears between said drive and driven member, a rotary member intermediate said gears and drive member, a clutch for coupling said rotary member to said drive member, a brake for said rotary member, and means for shifting said gears adapted to automatically release said clutch and apply said brake.

4. In a transmission-gearing the combination with a drive member, and a driven member, of shiftable gears therebetween, a rotary drum secured to said drive member, a rotary head connected with said gears having an annular flange surrounding said drum and spaced therefrom, a flexible band encircling said drum within the said annular flange, and having one end connected to said head, a peripheral brake surrounding said flange and means for alternately tightening said band and applying said brake to start and stop said gearing.

5. In a transmission-gearing, the combination with a drive member and a driven member, of shiftable gears between said drive and driven members, a clutch between said drive member and said gears, automatic means for shifting said gears and releasing said clutch in advance of the establishment of a new drive-train, and independent operable means for throwing in said clutch.

6. In a transmission-gearing the combination with a drive member and a driven member of shiftable gears between said drive and driven member, a common actuating member including a rotary shaft for shifting said gears to successively establish the different drive-trains, a clutch between said drive member and said gears and means for automatically releasing said clutch upon the movement of said actuating member before the establishment of each successive drive-train.

7. In a transmission-gearing, the combination with a drive member and a driven member, of shiftable gears between said drive and driven members, a clutch between said gears and the drive member, automatic cam-actuating means for releasing said clutch in advance of the shifting of said gears, and independent means for throwing in said clutch after said shifting operation.

8. A transmission-gearing comprising a drive-shaft, and a driven wheel, shiftable gears between said drive-shaft and driven wheel, a friction-clutch between said gearing and drive-shaft, a rock-shaft for shifting said gears, a cam on said rock-shaft for releasing said friction-clutch in advance of the changing of said gears, and an independently-operable cam for tightening said clutch after the shifting of said gears.

9. In a transmission-gearing the combination with a drive member and a driven member, of shiftable gears forming drive-trains therebetween, a clutch between said drive member and gears, means for shifting said gears to successively establish different trains, means automatically operating upon the shifting of said gears to release said clutch in advance of the establishment of each successive train, independent means for reëngaging said clutch, and means for automatically locking said gear-shifting mechanism between the establishment of two trains.

10. In a transmission-gearing the combination with a drive member and a driven member of a gear-train between said drive and driven member comprising two adjacent intermeshing gears, one of which is shiftable axially out of engagement with the other, and a reversing-gear meshing with one of said adjacent gears and adjustable about the axis thereof into mesh with the other of said gears and forming an intermediate between said adjacent gears when the latter are out of mesh with each other whereby the direction of rotation of the driven member may be reversed, and means for automatically removing the power from the drive-shaft during said adjustment.

11. In a transmission-gearing the combination with a drive member and a driven member of a gear-train between said drive and driven members comprising two adjacent intermeshing gears one of which is shiftable axially out of engagement with the other, a reversing-gear meshing with one of said adjacent gears and adjustable about the axis thereof into mesh with the other gear and forming an intermediate between said adjacent gears and out of mesh with each other and means for simultanously adjusting said axially-shiftable gear and rotary adjustable gear to change the direction of rotation.

12. In a transmission-gearing the combination with a drive member and a driven member, of a gear-train between said drive and driven member comprising two adjacent intermeshing gears one of which is shiftable axially out of engagement with the other, a reversing-gear meshing with one of said adjacent gears and adjustable about the axis thereof into mesh with the other gear forming an intermediate between said adjacent gears when out of mesh with each other, means for simultaneously adjusting said axially-shiftable gear and rotary adjustable gear and automatic means for laterally separating said adjacent gears during the axial adjustment of the one and subsequently returning them whereby interference of teeth is avoided during the axial shifting.

13. In a transmission-gearing the combination with a drive member and a driven member sleeved thereon, of gears on said drive and driven member, the former being axially shiftable, a counter-shaft gears thereon respectively intermeshing with the gears on said drive and driven member, eccentric pivotal bearings for said counter-shaft whereby it may be shifted laterally to disengage the intermeshing gears, a reversing-gear intermeshing with one of the gears on said counter-shaft, a rock-arm carrying said reversing-gear and adapted to shift the same around the axis of said counter-shaft and into engagement with said shiftable gear on the drive member, and mechanism for simultaneously shifting said shiftable gear, rocking said rock-arm and rotating said eccentric pivotal bearings whereby the direction of rotation of the driven member may be reversed and said gears may be shifted without interference.

14. In a transmission-gearing the combination with a drive-shaft of a driven member sleeved thereon and a gear-wheel on the driven member, a gear-wheel rotatively fixed but axially shiftable upon said drive-shaft, a counter-shaft having mounted thereon a pair of gears for intermeshing with the gear on said driven member, and said shiftable gear in one position of adjustment, a rock-arm fulcrumed on said counter-shaft a reversing-gear mounted on said rock-arm in mesh with the gear on said counter-shaft, coöperating with said shiftable gear, eccentric pivotal bearings for said counter-shaft, a rack and pinion for rotating said eccentric bearings, a controlling rock-shaft and cams on said rock-shaft for actuating said rock-arm and said rack, and for shifting said shiftable gear.

15. In a transmission-gearing, the combination with a drive member and a driven member, of shiftable gears between said drive and driven members, a rotary member intermediate said drive member and said shiftable gears, means for coupling said rotary member with said drive member, and means for arresting said rotary member when released by said first-mentioned means.

In testimony whereof I affix my signature in presence of two witnesses.

EUGENE C. RICHARD.

Witnesses:
   JAS. P. BARRY,
   EMMA I. BARNES.